Sept. 1, 1925.  
W. T. HOFMANN  
1,551,662  
PROCESS FOR MAKING PREPARED COVERINGS  
Filed March 18, 1922   2 Sheets-Sheet 1
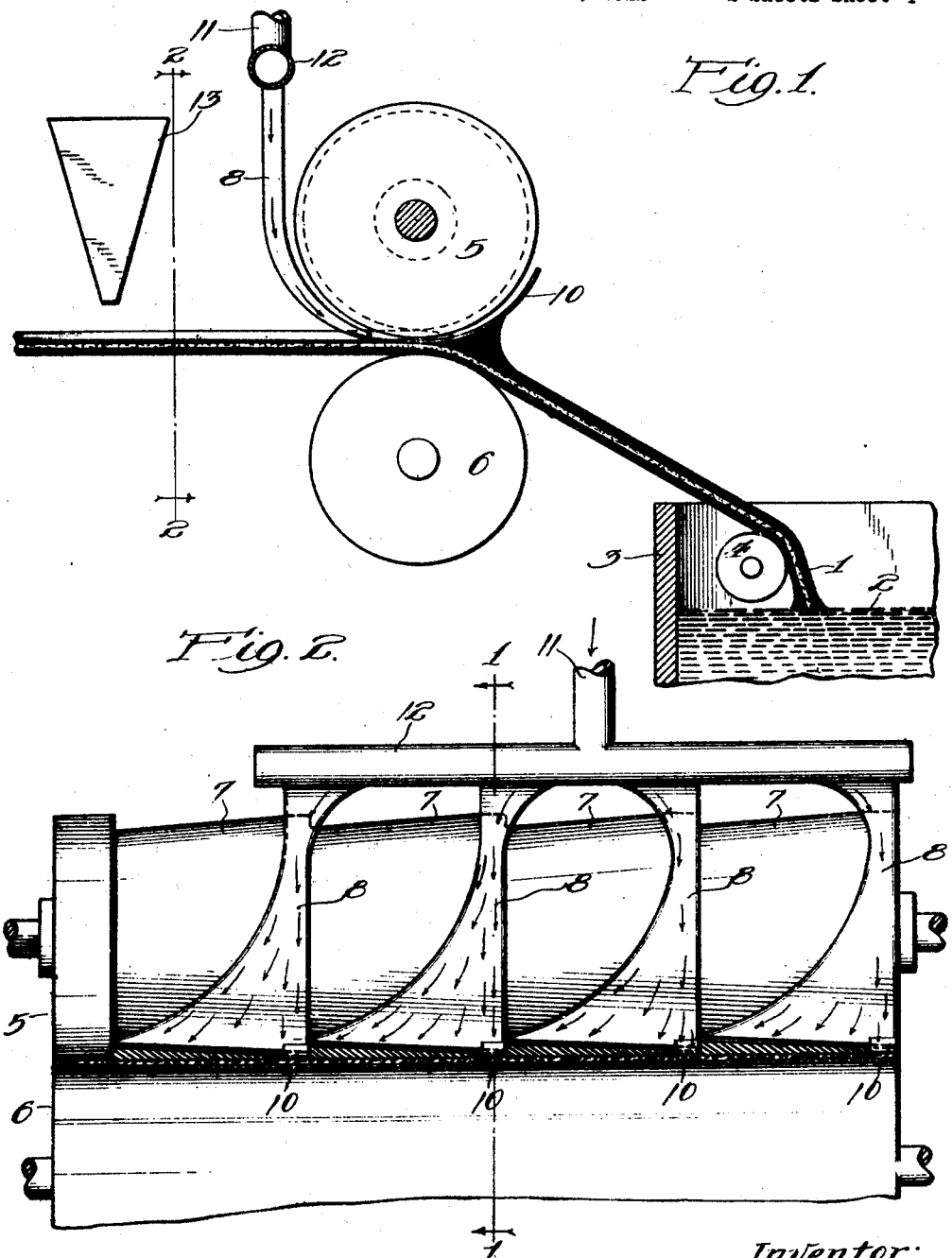
Inventor:
William T. Hofmann.

Sept. 1, 1925.
W. T. HOFMANN
1,551,662
PROCESS FOR MAKING PREPARED COVERINGS
Filed March 18, 1922    2 Sheets-Sheet 2
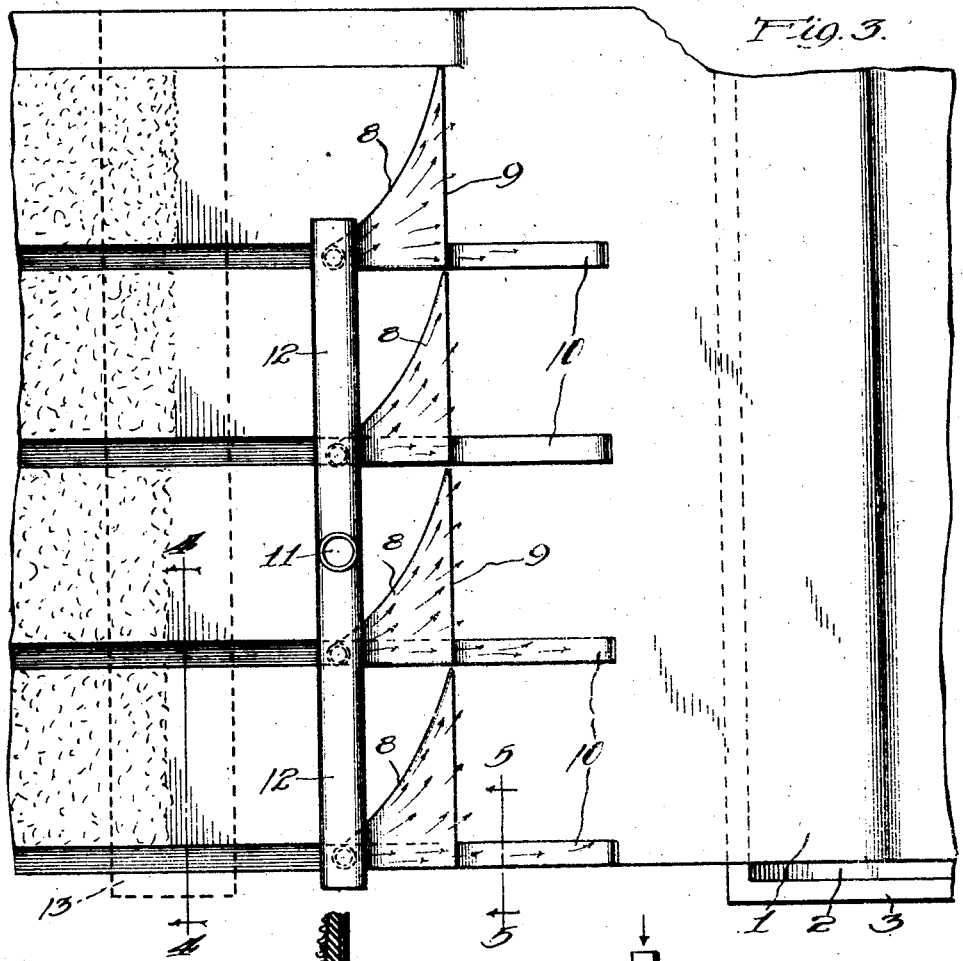
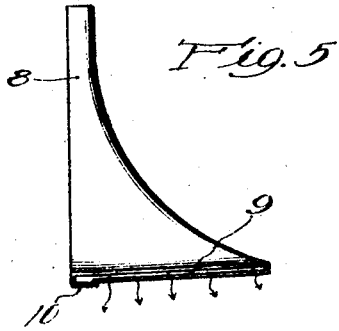
Witness:
Inventor:
William T. Hofmann,
By Frank L. Belknap, Atty.

Patented Sept. 1, 1925.

1,551,662

UNITED STATES PATENT OFFICE.

WILLIAM T. HOFMANN, OF CHICAGO, ILLINOIS, ASSIGNOR TO BECKMAN-DAWSON ROOFING COMPANY, OF CHICAGO, ILLINOIS, A CORPORATION OF ILLINOIS.

PROCESS FOR MAKING PREPARED COVERINGS.

Application filed March 18, 1922. Serial No. 544,725.

*To all whom it may concern:*

Be it known that I, WILLIAM T. HOFMANN, a citizen of the United States, residing in the city of Chicago, county of Cook, and State of Illinois, have invented certain new and useful Improvements in Processes for Making Prepared Coverings, of which the following is a specification.

This invention relates to a process for producing prepared siding and refers more particularly to a process for producing a prepared waterproofing material which has the appearance of clapboarding when applied as a siding in building construction.

Among the objects of the invention are to provide a product which is waterproof and attractive in appearance, is easily applied and is cheaply manufactured; to provide a process somewhat similar to that employed in the producing of prepared shingles in that a waterproof coating or saturant is applied to the material by passing the same through a bath and subsequently imposing a design and applying a grit surface upon the coated material; to provide an improved type of apparatus for producing this product.

Fig. 1 is a side sectional view of a portion of the apparatus taken along the line 1—1 in Fig. 2.

Fig. 2 is a rear view of the apparatus looking in the direction of the arrows in Fig. 1.

Fig. 3 is a plan view of the device for producing the siding material, with both press rolls removed.

Fig. 4 is a sectional view taken along the line 4—4 in Fig. 3.

Fig. 5 is a front elevational detail view of the mouth piece of one of the blowing tubes taken along the line 5—5 in Fig. 3.

In the drawings are shown only those parts of the apparatus which are important to the invention here disclosed, a substantial part of the machine being similar in character to the machine used in connection with the making of prepared roofing.

Referring in detail to the drawings, the felted fibrous sheet 1 commonly used in the roofing art is fed to and passed through a waterproof saturant 2 contained in a tank 3 where the waterproof coating substance permeates the body of the sheet and supplies the heavy coating to the surface thereof. The sheet is then directed over a roll 4 and is passed between a press roll 5 and a bed roll 6 which serve to spread the waterproof coating evenly over the surface of the sheet and cause the coating to become more firmly bonded to the fibrous base. The upper press roll 5 has a number of tapered shoulders as shown at 7 which in passing over the coating produce a jagged design upon the upper surface coating similar to overlapping clapboards used as siding in frame construction.

There is positioned at regular intervals across this sheet, a plurality of air tubes 8 which terminate in a wide mouth piece 9 above the sheet 1. Immediately adjacent the vertical side of these tubes, at the bottom of the mouth piece, is attached a flexible shoe 10 which extends between the rolls and is upturned to conform somewhat with the periphery of the upper roll. The function of these shoes which are attached to the separate air tubes is to remove the coating substance from a narrow band or trough on the coated sheet at regular intervals across its surface; thus in forming there is between each tapered ridge a narrow band of uncoated surface which subsequent to surfacing with a granular surfacing material or grit, stands out as a black band. During the forming operation which is done by the upper ridged press roll, there is a constant blast of air blown down the separate tubes 8 onto the surface of the sheet. This blast is supplied from a compressor not shown, through the line 11 and header 12 to the separate tubes. The function of the air blast is to assist the upper roll in forming the ridged design upon the surface coating and to partially set the waterproofing material when it has been formed in this design so that it will not flow back due to its semi-liquid condition, into a flat surface coating. Thus as the coated sheet is fed between the rolls 5 and 6, the shoes 10 attached to the separate mouth pieces, push relatively clear furrows in the coated sheet, substantially exposing the sheeted surface while the upper roll assisted by the air blast imposes a ridged design such as that clearly brought out in Fig. 4 upon the surface of the coated sheet. Subsequent to the forming of this design, the coated portion of the sheet may have applied thereto a granular substance such as colored grits or comminuted slate by the hopper 13. After surfacing the sheet may be further rolled to press the surfacing material into the coating. A sheet formed in this manner will produce a surface which is attractive in appearance and may be used for siding material in the place of clapboarding at a much cheaper cost. In addition to its use as a siding, it may be used as a roofing or in other manners connected with building construction.

I claim as my invention:

1. A process for forming a waterproof sheet simulating overlapping clapboards used for siding, consisting in coating the felted fibrous sheet with a waterproofing substance, passing the coated sheet through a forming operation and producing an embossed design in the coated substance, and simultaneously removing the coating substance from predetermined areas by an operation independent of the forming operation and surfacing substantial portions of the coated sheet subsequent to the forming operation.

2. A process for producing a waterproof sheet having the appearance of overlapping clapboards used for siding, consisting in coating the sheet with a waterproofing substance and while in a plastic state forming in the coating substance an embossed design on one surface of the sheet, directing an air blast onto the coating substance during the forming operation to set the form of the embossed design and prevent flowing of the coating, substantially removing the coating substance from predetermined areas and applying a surfacing material to the coated surface.

3. A process for producing a waterproof sheet having the appearance of overlapping clapboards used for siding, consisting in coating the sheet with a waterproofing substance and while in a plastic state forming in the coating substance an embossed design, directing an air blast onto the coating substance during the forming operation to set the form of the embossed design and prevent flowing of the coating, substantially removing the coating substance from predetermined areas and applying a surfacing material to the coated surface.

WILLIAM T. HOFMANN.